United States Patent [19]

Yawman

[11] Patent Number: 5,662,033

[45] Date of Patent: Sep. 2, 1997

[54] FOOD CUTTING DEVICE

[76] Inventor: Joseph Yawman, 116 Pine Rd., Big Pine, Calif. 93513

[21] Appl. No.: 615,450

[22] Filed: Mar. 14, 1996

[51] Int. Cl.$^6$ ............... A47J 17/00; A23L 1/212; A23P 1/00; B26D 3/26
[52] U.S. Cl. ............... 99/538; 83/356.1; 83/356.3; 83/435.15; 83/865; 83/932; 99/537
[58] Field of Search ............... 99/537, 538, 430, 99/439; 30/114, 124, 299, 303; 83/356.1, 356.3, 404.3, 420, 446, 597, 746, 762, 932, 437, 451, 865; 426/518, 438, 637

[56] References Cited

U.S. PATENT DOCUMENTS

| | | |
|---|---|---|
| 2,073,257 | 3/1937 | Van Riper . |
| 3,057,386 | 10/1962 | Massaro ............... 99/538 |
| 3,607,316 | 9/1971 | Hume ............... 99/545 |
| 4,436,025 | 3/1984 | Jones . |
| 4,614,141 | 9/1986 | Mendenhall et al. ............... 83/402 |
| 4,656,909 | 4/1987 | Carter . |
| 5,089,286 | 2/1992 | Geissler et al. ............... 426/615 |
| 5,121,679 | 6/1992 | Mertz . |
| 5,142,973 | 9/1992 | Tur et al. ............... 99/538 |
| 5,271,317 | 12/1993 | Agurrevere . |
| 5,363,756 | 11/1994 | Muro ............... 99/538 |
| 5,375,512 | 12/1994 | Ertmer ............... 99/538 |
| 5,421,249 | 6/1995 | Repisky et al. ............... 99/545 |
| 5,499,578 | 3/1996 | Payne ............... 99/537 |
| 5,520,105 | 5/1996 | Healy ............... 99/545 |

*Primary Examiner*—Timothy F. Simone
*Attorney, Agent, or Firm*—Weiner, Carrier & Burt, P.C.; William F. Esser; Irving M. Weiner

[57] ABSTRACT

A food cutting apparatus, comprising a base member having at least one slot defined substantially laterally therethrough, and an aperture defined substantially longitudinally therethrough for receiving a food article; a first cutting member, slidably engaged with the slot of the base member, for selectively cutting the food article substantially laterally therethrough, following placement of the food article in the base member; a second cutting member for cutting the food article substantially longitudinally, following placement of the food article in the aperture of the base member; wherein the second cutting member comprises a plurality of substantially circular cutting blades arranged in concentric arrangement; and wherein the second cutting member is selectively telescopically inserted within the aperture over the food article for cutting the food article substantially longitudinally.

18 Claims, 2 Drawing Sheets

FOOD CUTTING DEVICE

BACKGROUND OF THE INVENTION

1. Field of the Invention

The present invention pertains to a food slicer, and in particular to a device for producing ring-shaped foods.

2. Description of the Relevant Art

There are known food cutting devices. For example, Mertz U.S. Pat. No. 5,121,679 discloses a potato cutting apparatus having slidable tubular cutters for creating french fries.

Jones U.S. Pat. No. 4,436,025 discloses a device which slices foods into wedges utilizing a slidable handle that forces the food through intersecting blades.

Aguerrevere et al. U.S. Pat. No. 5,271,317 discloses a device which slices a potato into bar-shaped chips through use of an external piece which telescopically cooperates with an internal piece having intersecting cutting blades.

Ertmer U.S. Pat. No. 5,375,512 discloses an apparatus for slicing foods, comprising a row of cutting blades which are slidably movable along a frame member so as to slice through the food.

Van Riper U.S. Pat. No. 2,073,257 discloses a food slicing device having two cutting frames which pivotally attach to a base section so as to slice food along longitudinal and lateral axes.

The above-mentioned references, however, fail to disclose or otherwise suggest a food cutting device which quickly and easily cuts food into rings.

SUMMARY OF THE PRESENT INVENTION

The present invention overcomes the above-discussed limitations and shortcomings of known food slicers and satisfies a significant need for a device which slices foods into ring shapes.

According to the present invention, there is disclosed a base member having a plurality of elongated slots defined substantially horizontally therethrough, and an aperture defined substantially vertically therethrough; a first cutting member having a first handle member to which a plurality of blades are disposed in parallel arrangement to each other, with the blades being selectively slidable along the elongated slots of the base member by manual movement of the handle member; a second cutting member having a plurality of concentric, cylindrical cutting blades to which a second handle member is attached, the second cutting member being selectively telescopically received within the vertical aperture of the base member; and a food ejecting member having a plurality of prongs which suitably cooperate with the second cutting member so as to eject the ring-shaped foods therefrom.

In use, the first cutting member is inserted within the base member so that the blades thereof are substantially freely slidable along the elongated slots of the base member, by manually sliding the handle member of the first cutting member along the outer side of the base member. With the first cutting member positioned along an end portion of the base member, the food article which is desired to be sliced is placed in the base member via the vertical aperture thereof. Next, the first cutting member is manually slid along the base member so that the horizontally disposed blades of the first cutting member slice laterally through the food article. The second cutting member is then positioned over the food article and base member and thereafter urged downwardly through the food article, thereby slicing the food article longitudinally so that ring-shaped sections are formed. Next, the food ejecting member is positioned over the sliced food article so that the prongs thereof resist upward movement of the food article as the second cutting member is lifted from the base member. The ring-shaped pieces may be thereafter removed from the base member.

It is an object of the present invention to provide a device for quickly and easily creating foods having ring shapes.

It is another object of the present invention to provide a food processing device which slices foods so as to form ring shapes of varying sizes.

Still another object of the present invention is to provide such a food processing device which processes food manually.

Another object of the present invention is to provide such a food processing device which is dish washer safe.

Other objects, advantages and salient features of the present invention will become apparent from the following detailed description, which, when taken in conjunction with the annexed drawings, discloses preferred embodiments of the present invention.

DETAILED DESCRIPTION OF THE PREFERRED EMBODIMENTS

Figure 1:
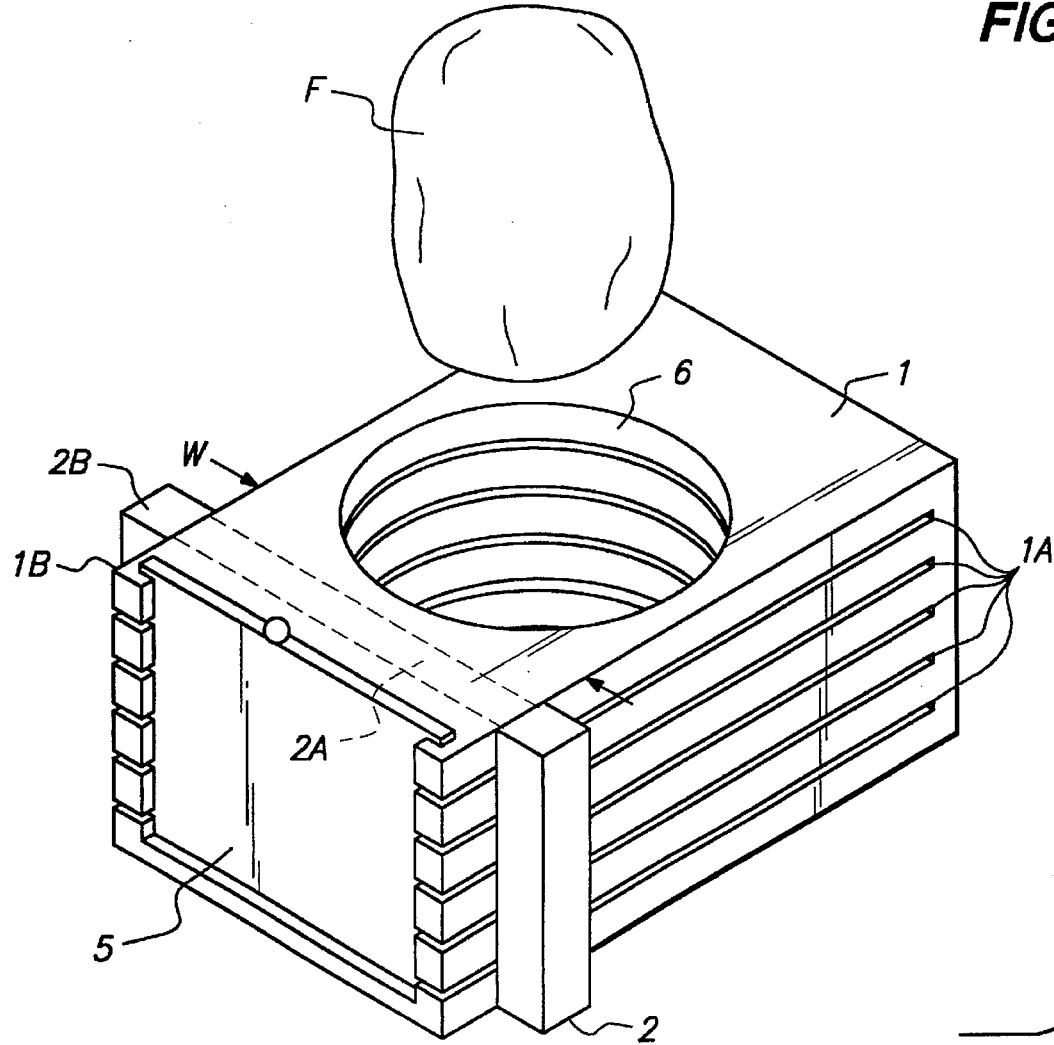
FIG. 1 is an exploded perspective view of a preferred embodiment of the present invention.
Figure 2:
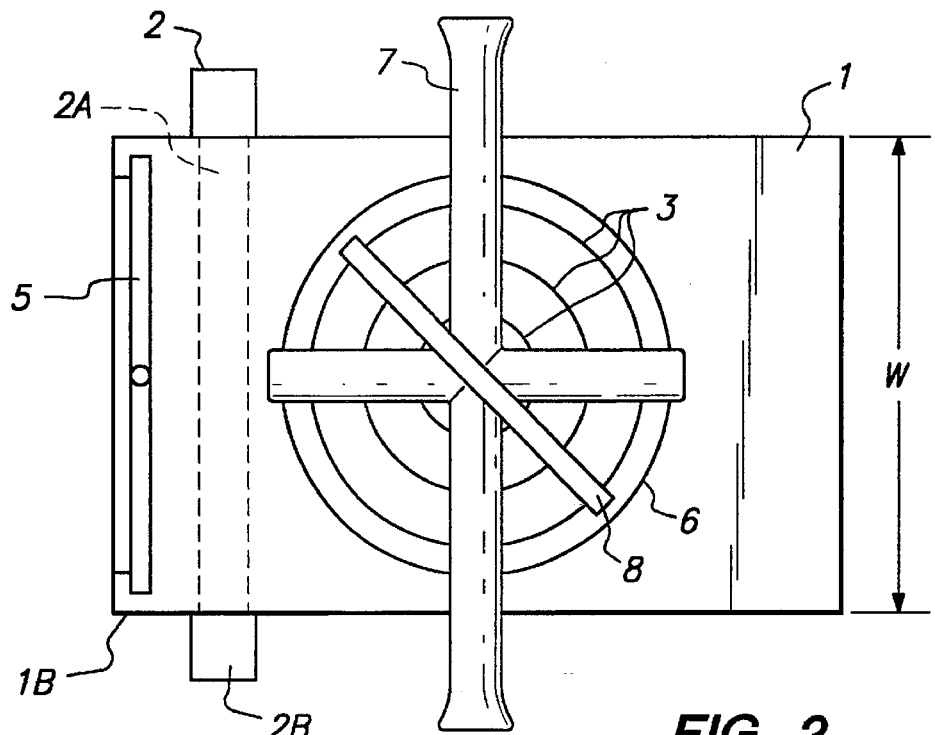
FIG. 2 is a top elevational view thereof.
Figure 3:
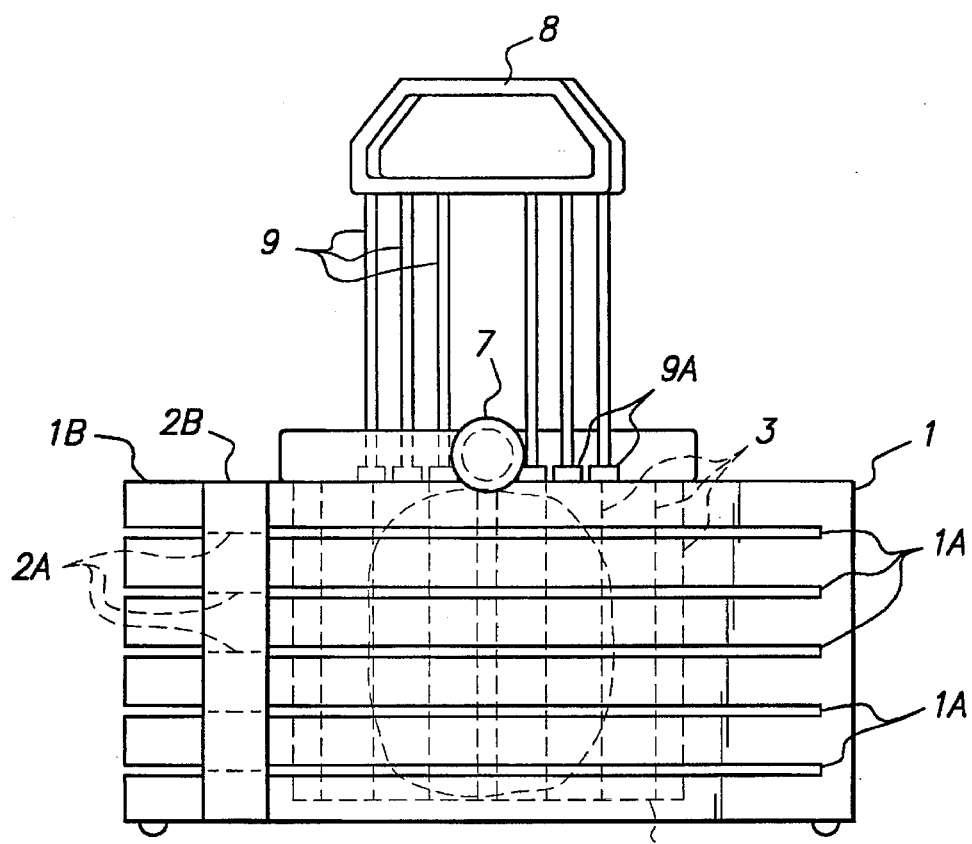
FIG. 3 is a side elevational view thereof.

Referring to FIGS. 1-3, there is disclosed a food preparation device comprising base member 1, first cutting member 2, second cutting member 3, food article ejecting member 4 and removable side panel 5. The present invention is preferably constructed from a sturdy material, such as molded plastic and/or stainless steel, but alternatively the invention is constructed from other materials.

The present invention preferably includes a means for receiving a food article, such as potato, for processing into pieces of predetermined shapes and sizes. As shown in FIGS. 1-3, the food article receiving means preferably but not necessarily includes base member 1, which includes recess or aperture 6 defined substantially longitudinally through a central portion thereof. Aperture 6 is preferably but not necessarily sized for receiving a wide assortment of foods therein, such as a potato, a cored apple, an onion, etc. In a preferred embodiment of the present invention, aperture 6 of base member 1 has a substantially circular cross-section. Alternatively, aperture 6 has different cross-sectional shapes.

Base member 1 preferably but not necessarily includes a plurality of slots 1A defined substantially horizontally therethrough. Slots 1A preferably extend from end 1B of base member 1 to an opposite end portion thereof (FIGS. 1 and 3). Each slot 1A is preferably but not necessarily adapted to slidably receive a cutting blade in order to provide guidance as the cutting blades cut through the food article so that a smooth and even cut is created.

Base member 1 is preferably but not necessarily constructed from a rigid material, such as molded plastic or fiberglass. Alternatively, base member 1 is constructed from other materials.

The preferred embodiments of the present invention preferably but not necessarily include a means for cutting the food article, such as a potato, substantially laterally into a plurality of cross-sectional pieces. The lateral cutting means preferably but not necessarily comprises first cutting member 2, having a handle portion 2B and a plurality of cutting blades 2A, as shown in FIG. 3. In a preferred embodiment of the present invention, each cutting blade 2A has a substantially linear cutting edge and extends substantially the entire width W of base member 1 (FIGS. 1 and 2). Alternatively, cutting blades 2A have nonlinear cutting edges and/or serrated cutting edges.

Cutting member 2 is preferably slidably engaged with base member 1 so that cutting member 2 may be manually slid through the food article (placed within aperture 6) by grasping handle portion 2B of cutting member 2.

Blades 2A of cutting member 2 are preferably arranged in a substantially vertically stacked arrangement, with each blade 2A being slidably engaged with a slot 1A of base member 1, as shown in FIG. 3. Slots 1A act to guide cutting member 2 as cutting member 2 is slid from one end of base member 1 to the opposite end thereof, thereby providing a clean and even cut through the food article. In one preferred embodiment of the present invention, cutting blades 2A are spaced substantially equidistantly apart so that restating cut portions of the food article have substantially the same width. Alternatively, adjacent cutting blades 2A are spaced at different distances from each other.

Base member 1 preferably but not necessarily includes side panel 5. As shown in FIGS. 1 and 2, side panel 5 slidably engages with a slot substantially vertically defined along end portion 1B of base member 1. In this way, cutting member 2 may be selectively disengaged from base member 1 for cleaning, replacing and/or sharpening of cutting blades 2A. When side panel 5 is securely engaged with end portion 1B of base member 1, cutting member 2 is substantially prevented from disengaging with base member 1.

According to the preferred embodiments of the present invention, the food cutting device includes a means for cutting and/or slicing the food article, such as a potato, substantially longitudinally into a plurality of pieces. The longitudinal food cutting means is preferably placed over the food article (which had been previously placed within base member 1) and manually urged downwardly so that the cutting means passes substantially longitudinally through the food article.

As shown in FIGS. 1 and 2, the longitudinal food cutting means preferably comprises a plurality of concentric cutting members 3. Each cutting member 3 includes one end portion having a sharpened, continuous edge for easily slicing through a food article. The innermost cutting member 3 preferably comprises a rod member having a sharpened end. In one preferred embodiment of the present invention, each concentric cutting member 3 includes a serrated edge for slicing through the food article.

Cutting members 3 are preferably but not necessarily equidistantly spaced, but alternatively cutting members 3 are spaced apart at different distances from each other. The outermost cutting member 3 of the longitudinal food cutting means preferably but not necessarily substantially telescopically engages with the inner surfaces forming aperture 6 of base member 1 when slid therein.

Concentric cutting members 3 are preferably substantially cylindrical having continuous, substantially circular cross-sections (FIG. 1) so that the food article is cut into pieces having substantially ring-shaped cross-sections. In alternative embodiments, concentric cutting members 3 have cross-sections having other shapes, such as rectangles, ovals, triangles, etc.

As shown in FIGS. 1 and 2, the longitudinal food cutting means includes a handle member 7 to which the end portions of concentric cutting members 3 are attached. Handle member 7 allows the user to easily slide cutting members 3 downwardly through the food article. In a preferred embodiment of the present invention, handle member 7 of the longitudinal food cutting means comprises two intersecting post members which form a cross shape (FIGS. 1 and 2). Alternatively, handle member 7 comprises a single post member extending substantially diametrically across concentric cutting members 3.

Concentric cutting members 3 slice longitudinally through a food article, such as a potato, so as to form ring-shaped food pieces whose thicknesses are determined by the spacing between cutting blade members 2A of lateral food cutting member 2. The present invention preferably but not necessarily includes a means for ejecting the ring-shaped food pieces from concentric cutting members 3 following concentric cutting members 3 passing through the food article. The food ejecting means operatively engages with concentric cutting members 3 so as to push the food pieces therefrom.

The food ejecting means preferably comprises a substantially fork-shaped member 4, having a handle member 8 from which a plurality of prong members 9 extend outwardly in a first direction. The end portions of each prong member 9 preferably but not necessarily includes a substantially flat tab member 9A which engages with the food so as to push them from concentric cutting members 3.

As shown in FIGS. 1 and 3, prong members 9 of the food ejecting means are spaced apart so that each prong member 9 is disposed between adjacent concentric cutting members 3. In this way, the food pieces which are positioned between adjacent concentric cutting members 3 following a cutting operation are expelled therefrom as the food ejecting means is inserted therewithin.

In use, lateral cutting member 2 is first engaged with base member 1 by removing side panel member 5, slidably inserting lateral cutting member 2 along slots 1A of base member 1, and securing panel member 5 into engagement with base member 1. Lateral cutting member 2 is then slid into place relative to base member 1 so that it is at an end portion thereof. The food article desired to be cut is then placed within aperture or recess 6 of base member 1. Next, the food article is sliced laterally so as to form a plurality of pieces having predetermined thicknesses, by manually grasping handle 2B of lateral cutting member 2 and sliding cutting member 2 along slots 1A of base member 1 until it passes entirely through the food article and is positioned at the opposite end portion of base member 1.

Thereafter, the food article is formed into a plurality of ring-shaped food portions by placing the longitudinal food cutting means over the laterally-sliced food article and urging the longitudinal food cutting means downwardly through use of handle 7 until concentric cutting members 3 pass entirely through the food article. When the cutting edges 3A contact the bottom portion of base member 1, the sliced food article is substantially entirely disposed within concentric cutting members 3.

Next, the ring-shaped food articles are withdrawn from concentric cutting members 3 by placing the food ejecting means over base member 1, the sliced food article and concentric cutting members 3 (FIG. 3), and pulling concentric cutting members 3 upwardly with one hand while maintaining the food ejecting means in a stable position with the other hand, until all of the ring-shaped food article pieces are ejected from concentric cutting members 3. Thereafter, the ring-shaped food article pieces may be collected from aperture 6 of base member 1.

It is understood that ring-shaped food articles may be created by changing the order of steps described hereinabove. For example, the longitudinal food cutting means may be manipulated prior to manipulation of the lateral food cutting means.

Although there have been described what are at present considered to be the preferred embodiments of the present invention, it will be understood that the invention can be embodied in other specific forms without departing from the spirit or essential characteristics thereof.

The described embodiments, are therefore, to be considered in all aspects as illustrative, and not restrictive. The scope of the invention is indicated by the appended claims rather than the foregoing description.

The invention claimed is:

1. A food slicing device, comprising:
    a base member having at least one slot defined substantially laterally therethrough and an aperture defined substantially longitudinally therethrough;
    first cutting means, slidably engaged with said at least one slot of said base member, for selectively cutting a food article substantially laterally therethrough, following placement of the food article in said aperture of said base member;
    second cutting means for cutting the food article substantially longitudinally, following placement of the food article in said aperture of said base member;
    wherein said second cutting means comprises a plurality of concentric cutting members, with each of said concentric cutting members having a cutting edge; and
    wherein said second cutting means is selectively telescopically inserted within said aperture over the food article for cutting the food article substantially longitudinally.

2. A device as recited in claim 1, further including:
    means for ejecting the food article from said second cutting means following cutting of the food article therewith.

3. A device as recited in claim 2, wherein:
    said ejecting means comprises a handle member and a plurality of prongs which extend outwardly therefrom in a first direction, and wherein spacing between adjacent prongs allows each of said prongs to extend between adjacent concentric cutting members of said second cutting means when said prongs are inserted therein.

4. A device as recited in claim 1, wherein:
    said first cutting means comprises a first handle member and at least one blade member attached thereto, said handle member extends outwardly from said base member when said first cutting means is engaged therewith.

5. A device as recited in claim 1, wherein:
    said second cutting means includes a second handle member to which each of said concentric cutting members are attached.

6. A device as recited in claim 4, wherein:
    said base member includes a plurality of slots defined substantially laterally therethrough; and
    said first cutting means comprises a plurality of blade members which are attached to said first handle member, with each said blade member being slidably engaged with a slot of said base member when said first cutting means is attached thereto.

7. A device as recited in claim 1, wherein:
    said base member includes a selectively removable panel member which comprises a side panel of said base member when attached thereto.

8. A device as recited in claim 1, wherein:
    each of said concentric cutting members has a substantially circular cross-section.

9. An apparatus for processing food articles, comprising:
    means for slicing a food article substantially laterally;
    means for slicing the food article substantially along its longitudinal axis;
    means, operative connected with said lateral slicing means, for guiding said slicing means and said longitudinal slicing means;
    means for maintaining the food article within a defined area relative to said lateral slicing means and said longitudinal slicing means;
    wherein said longitudinal slicing means comprises at least one substantially continuous cutting edge;
    said food article maintaining means comprises a base member having at least one slot defined therealong and an aperture defined through a central portion of said base member so as to receive the food article; and
    said lateral slicing means comprises at least one blade member which is selectively slidably engaged with said slot of said base member.

10. An apparatus as recited in claim 9, wherein:
    said lateral slicing means includes a plurality of blade members, each of said blade members having a substantially linear edge for slicing the food article.

11. An apparatus as recited in claim 9, wherein: said longitudinal slicing means comprises at least one blade member having a substantially circular edge for slicing the food article.

12. An apparatus as recited in claim 11, wherein:
    said longitudinal slicing means comprises a plurality of blade members, with each of said blade members having a substantially circular edge for slicing the food article, and wherein said substantially circular blade members are disposed relative to each other so as to form concentric blade members.

13. An apparatus as recited in claim 9, wherein:
    said base member includes a plurality of slots disposed in substantially parallel alignment with each other; and
    said lateral slicing means comprises a plurality of blade members, with each of said blade members being selectively slidably engaged with one of said slots of said base member.

14. An apparatus as recited in claim 12, further including:
    means, operatively engaged with said longitudinal slicing means, for ejecting the food article from said blade members of said longitudinal slicing means.

15. An apparatus for processing food articles, comprising:
    means for slicing a food article substantially laterally;
    means for slicing the food article substantially along its longitudinal axis;
    means, operative connected with said lateral slicing means, for guiding said slicing means and said longitudinal slicing means;
    means for maintaining the food article within a defined area relative to said lateral slicing means and said longitudinal slicing means;

wherein said longitudinal slicing means comprises at least one substantially continuous cutting edge;

said longitudinal slicing means comprises at least one blade member having a substantially circular edge for slicing the food article;

said longitudinal slicing means comprises a plurality of blade members, with each of said blade members having a substantially circular edge for slicing the food article, and wherein said substantially circular blade members are disposed relative to each other so as to form concentric blade members;

means, operatively engaged with said longitudinal slicing means, for ejecting the food article from said blade members of said longitudinal slicing means; and said food ejecting means comprises a handle member and a plurality of prongs which extend therefrom; and said prong members are disposed relative to each other so as to slide between adjacent concentric blade members.

16. An apparatus as recited in claim 9, wherein:

said base member includes an end portion which is removable for engagement of said lateral slicing means with said base member.

17. A food cutting device, comprising:

first means for receiving a food article;

second means, slidably engaged with said first means, for cutting the food article substantially laterally while the food article is received by said first means;

third means, slidably engaged with said first means, for cutting the food article substantially longitudinally while the food article is received by said first means;

said second means includes a plurality of cutting edges for cutting the food article substantially laterally;

said third means includes a plurality of cutting edges for cutting the food article substantially longitudinally;

wherein said second means and said third means cut the food article into ring-shaped pieces;

said first means comprises a housing member having a plurality of slots defined therethrough and a recess for receiving the food article; and said second means comprises a plurality of blade members, each of said blade members being selectively slidably engaged with one of said slots of said housing member.

18. A device as recited in claim 17, wherein:

said first means includes a recess for receiving the food article; and said third means comprises a plurality of concentric blades, with said concentric blades being selectively telescopically inserted within said recess of said first means.

* * * * *